Feb. 15, 1966  C. P. ATWOOD  3,234,999
REGENERATOR SEAL
Filed Oct. 7, 1963
4 Sheets-Sheet 1
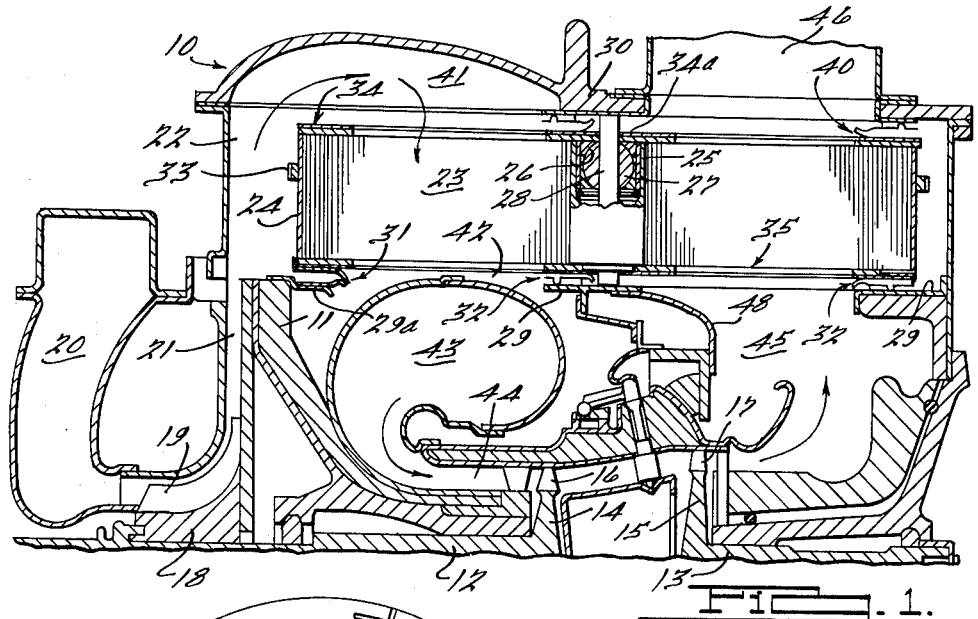
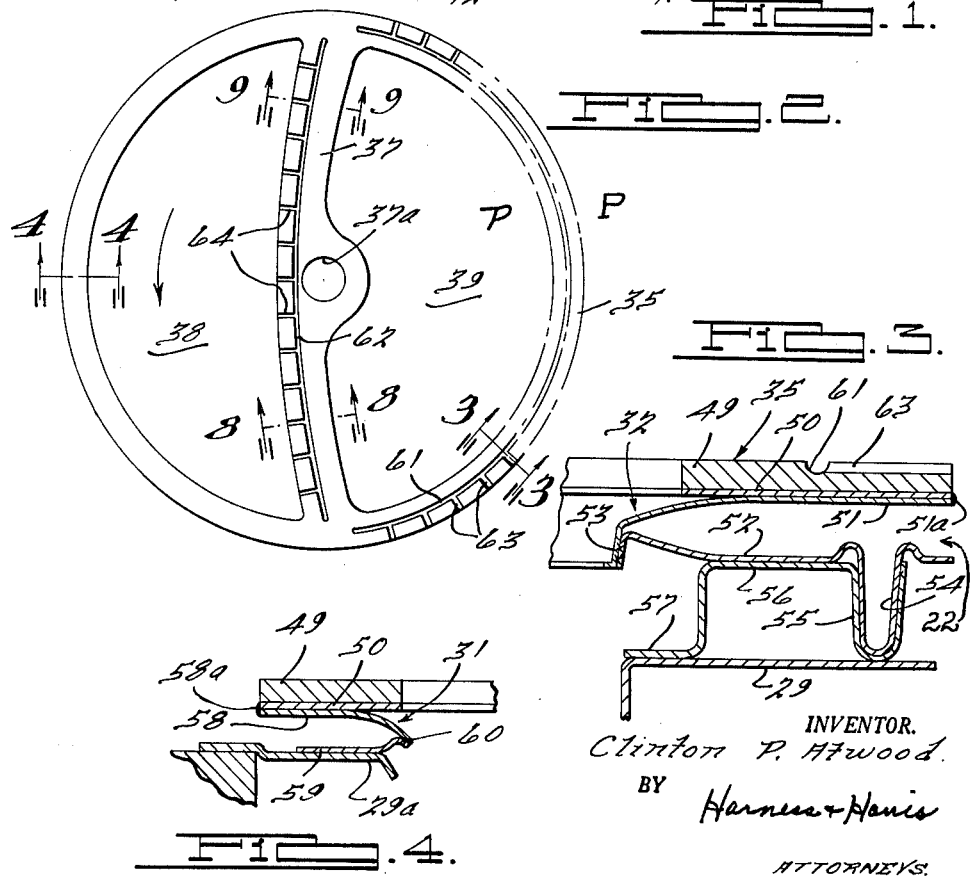
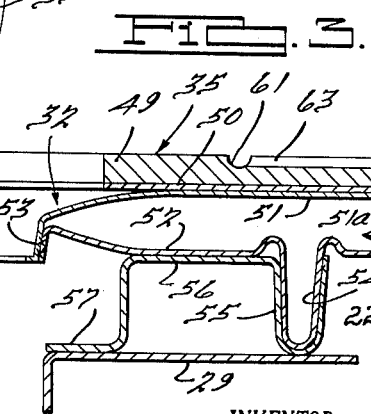
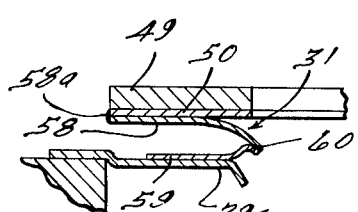
INVENTOR.
Clinton P. Atwood
BY
Harness + Harris
ATTORNEYS.

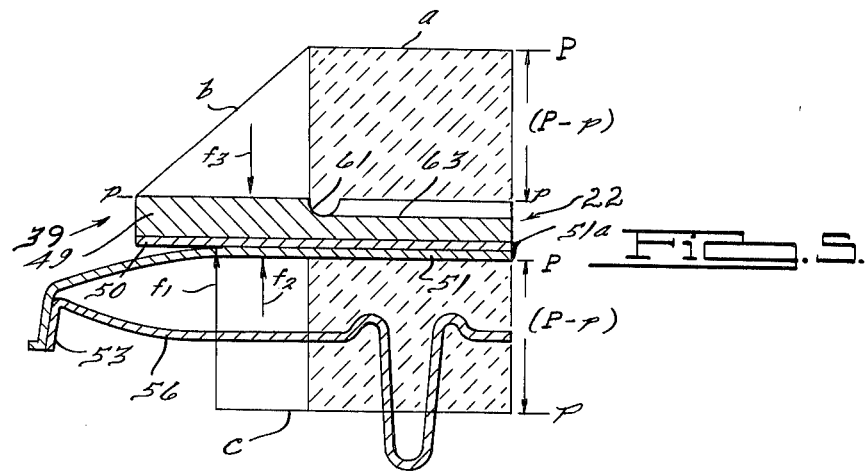
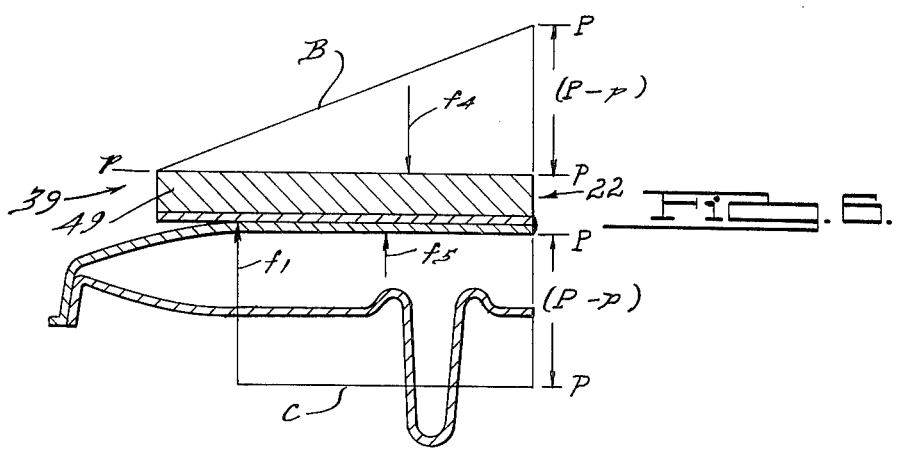
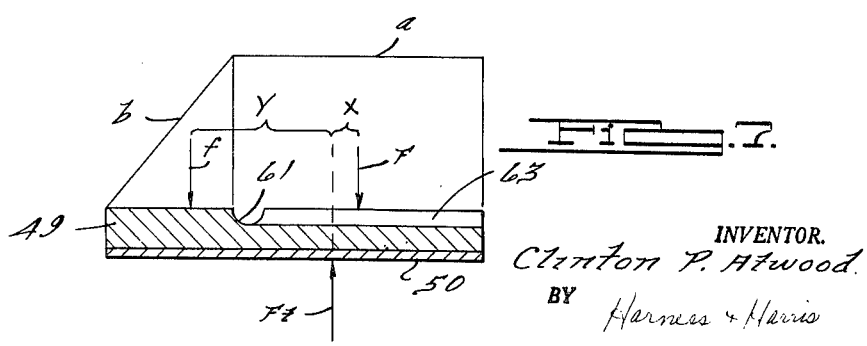

Feb. 15, 1966    C. P. ATWOOD    3,234,999
REGENERATOR SEAL
Filed Oct. 7, 1963    4 Sheets-Sheet 3
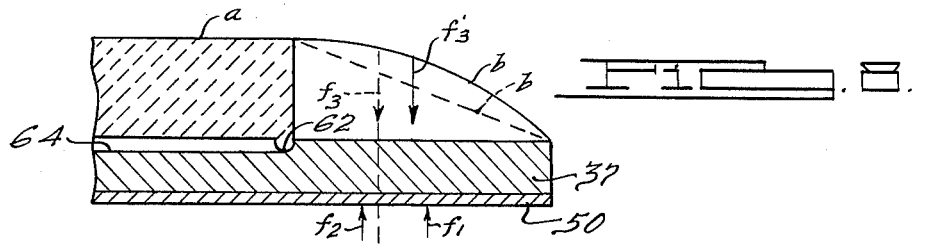
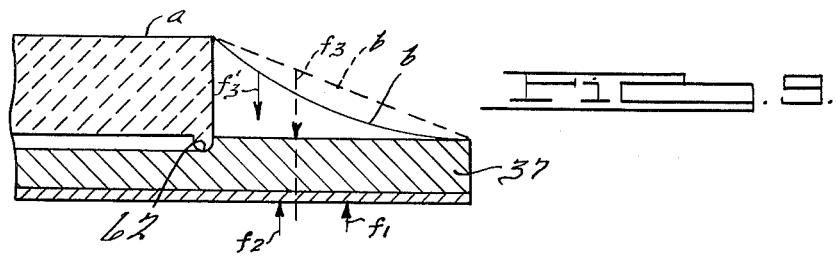
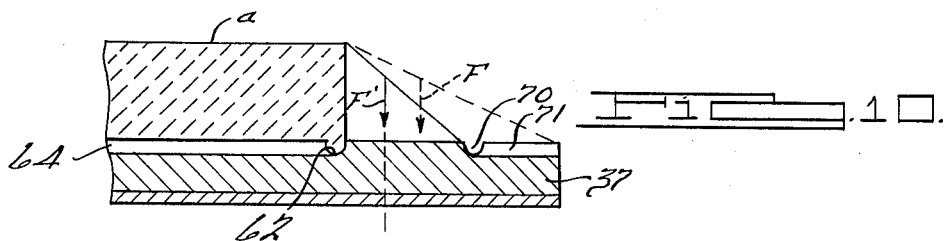
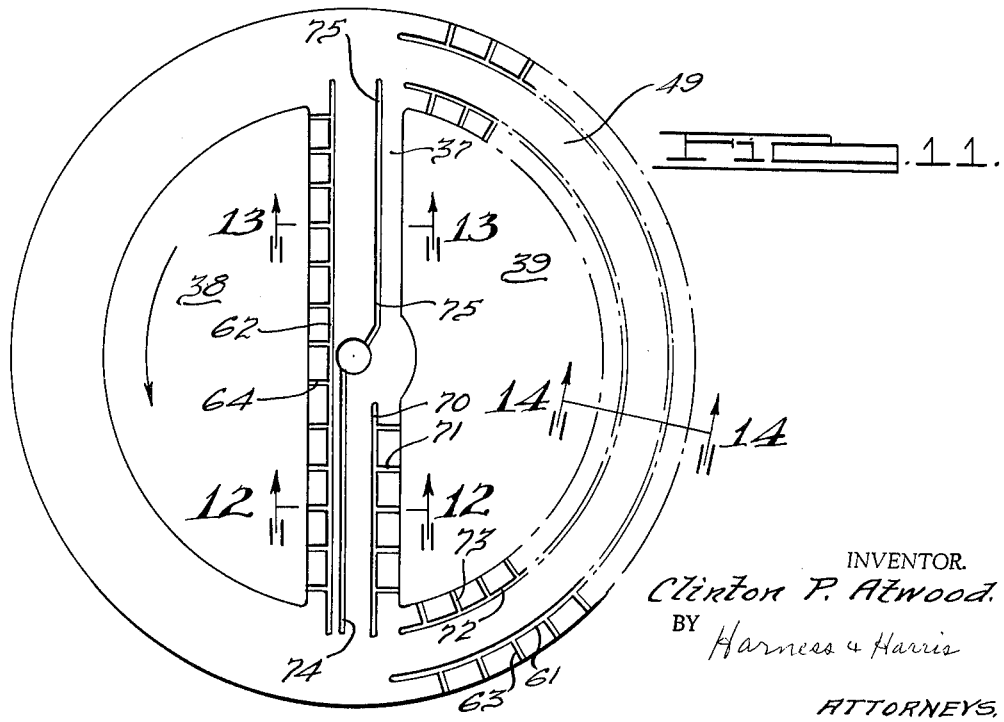
INVENTOR.
Clinton P. Atwood.
BY Harness & Harris
ATTORNEYS.

Feb. 15, 1966   C. P. ATWOOD   3,234,999
REGENERATOR SEAL
Filed Oct. 7, 1963   4 Sheets-Sheet 4

INVENTOR.
Clinton P. Atwood.
BY
Harness + Harris
ATTORNEYS.

United States Patent Office 3,234,999
Patented Feb. 15, 1966

3,234,999
REGENERATOR SEAL
Clinton P. Atwood, Warren, Mich., assignor to Chrysler Corporation, Highland Park, Mich., a corporation of Delaware
Filed Oct. 7, 1963, Ser. No. 314,441
7 Claims. (Cl. 165—9)

This invention is concerned with gas turbine engines and in particular with an improved sealing structure for use in contact with a rotating surface of an automotive gas turbine regenerator and is a continuation-in-part of the invention described in my copending application Serial No. 100,386, filed April 3, 1961, now abandoned.

In one preferred gas turbine arrangement, a disk type counter flow rotary regenerator comprising a bore having plane parallel end faces at axially opposite ends and a multitude of axial flow passages extending from one end face to the other cooperate with flexible non-rotating sector shaped rubbing seals in sliding and sealing engagement with the regenerator end faces. The rubbing seals provide fluid seals between the gas duct system of the engine housing and separate sectors of the regenerator end faces for directing the operating gases of the engine axially through the regenerator core.

The gas duct system is arranged to envelope the periphery of the regenerator in comparatively cool combustion supporting inlet air and to conduct the inlet air to a sector of one of the regenerator end faces, whereby the inlet air is preheated by passing axially through a sector of the regenerator core. The inlet air is then conducted by the duct system to a combustion chamber, where fuel is added and burned, and to the turbine rotors to drive the latter. The comparatively hot exhaust gases are then conducted by the duct system from the rotors to another sector of the opposite regenerator end faces, whereby the regenerator core is heated by axial flow of the exhaust gases therethrough. In consequence, the first named axial end face of the regenerator will operate at an appreciably lower temperature than the opposite axial end face and will be deformed concavely simultaneously with a convex deformation of the colder opposite regenerator end face.

One of the major problems in the provision of a fluid seal in sliding contact with a rotating surface, as for example the surface of a counterflow type regenerator as described, is to maintain the surface of the flexible seal uniformly against the constantly warping regenerator surface and to compensate for the tendency of the rubbing seal to wear unevenly as a result of different materials at different parts of its surface, different speeds of relative movement between the seal and regenerator at different radial locations of the seal, and various mechanical and gas pressure forces urging the seal non-uniformly against the regenerator.

In such seals known to the art heretofore, the customary distribution of forces over the sealing area frequently results in torsional moments tending to twist or overturn the seal and necessitates external mechanical forces to hold the seal in uniform sealing and bearing contact with the regenerator surface. Such external forces when added to the previously unbalanced forces urge the rubbing seal into sealing contact with the regenerator with appreciably greater force than is necessary for optimum sealing and frequently occasions a magnified local unbalance, causing undesirable friction and loss of engine output power and excessive and uneven wearing of the regenerator and seal at the region of sliding contact therebetween. In particular, localized wearing of the seal frequently results with consequent loss of sealing efficiency.

It is accordingly an important object of the present invention to provide an improved regenerator seal which is particularly adapted for use with an automotive gas turbine regenerator and which incorporates simple and effective means for avoiding excessive and poorly distributed forces on the seal; which achieves an improved distribution of the pressure forces of the gases being sealed so as to oppose and partially balance the forces urging the seal into sealing contact with the regenerator and to resist the moment of these latter forces tending to overturn or rotate the seal face; and which achieves a particularly low resultant force per unit of area over the face of the seal urging the latter into sealing contact with the regenerator.

Another object is to provide improvements in such a seal effective to reduce and to predetermine the unit bearing load on the sealing surface in contact with the regenerator so as to balance the seal against torsional forces tending to twist the same from its sealing engagement with the regenerator. By thus balancing the load on the seal, it is feasible to minimize the magnitude of force required to maintain the seal in bearing contact with the regenerator surface. Overall frictional power losses and wearing are thus minimized and the use of lightweight material with consequent economies in construction is enabled.

Another important object is to provide an improved seal of the above character having provision for supplying and distributing pressurized fluid between the juxtaposed surfaces of the seal and the regenerator so as to minimize friction and corrosive action and to maintain an optimum temperature condition between the sealing surfaces.

Another and more specific object is to provide a fluid seal of the above character between high and low pressure fluids, the seal having a flexible bearing surface adapted to conform to and maintain sliding contact with a moving part, as for example the rotating and continually warping surface of a gas turbine regenerator. Opposite edges of the bearing surface are arranged in communication with the high and low pressure fluids, respectively, for which the seal is required and a portion of the bearing surface between said opposite edges is in sealing contact with the rotating part. A small fluid conducting groove is provided in the bearing surface confronting the moving part and is connected with a suitable source of fluid pressure to effect a desired pressure distribution between the bearing surface and moving part as the result of a small but finite fluid flow from the groove toward either or both of said opposite edges.

By such an arrangement, the magnitude of unbalanced forces and moments acting on the seal can be drastically reduced to enable reduction of localized frictional force on the sealing surface and non uniform wearing thereof. The groove can be connected with either of the fluids being sealed or with a supplemental source of fluid, of higher or lower pressure or temperature.

Another object is to provide a sector seal for the plane surface of a disk type counterflow regenerator comprising a flexible rubbing seal in sliding and sealing engagement with the regenerator surface. The rubbing seal has a generally diametrical cross arm containing a diametrical fluid pressure transfer groove confronting the regenerator surface and closed at its opposite ends. As the regenerator rotates and carries high pressure gases circumferentially across the portion of the cross arm extending radially in one direction from the center of the regenerator, and carries low pressure gases circumferentially across the portion of the cross arm extending in the opposite radial direction, the high pressure gases will flow diametrically along the cross arm within the fluid pressure transfer groove from the high pressure end to the low pressure end and thence back to the high pressure side of the seal by virtue of rotation of the regenerator. A more nearly linear pressure gradient of desired configuration across the cross arm of the rubbing seal will result and the regenerator efficiency will be increased by reducing the transportation of gases circumferentially across the cross arm.

Other objects of this invention will appear in the following description and appended claims, reference being had to the accompanying drawings forming a part of this specification wherein like reference characters designate corresponding parts in the several views.

FIGURE 1 is a schematic longitudinal vertical midsectional view through a gas turbine engine embodying the present invention.

FIGURE 2 is a plan view of the lower sector plate of the sealing structure embodying the present invention.

FIGURE 3 is an enlarged sectional view taken in the direction of the arrows substantially along the line 3—3 of FIGURE 2.

FIGURE 4 is an enlarged sectional view taken in the direction of the arrows substantially along the line 4—4 of FIGURE 2.

FIGURE 5 is a sectional view through the seal similar to FIGURE 3, diagrammatically illustrating the pressure distribution at the seal.

FIGURE 6 is a view similar to FIGURE 5, showing the pressure distribution at the seal when the present invention is not employed.

FIGURE 7 is a sectional view similar to FIGURE 5, illustrating a modification of the present invention.

FIGURE 8 is a sectional view through the cross arm of the seal taken in the direction of the arrows substantially along the line 8—8 of FIGURE 2.

FIGURE 9 is a sectional view similar to FIGURE 8 taken in the direction of the arrows substantially along the line 9—9 of FIGURE 2.

FIGURE 10 is a view similar to FIGURE 8, showing a modification of the rubbing seal.

FIGURE 11 is a plan view similar to FIGURE 2 showing another modification of the invention.

Figure 12:
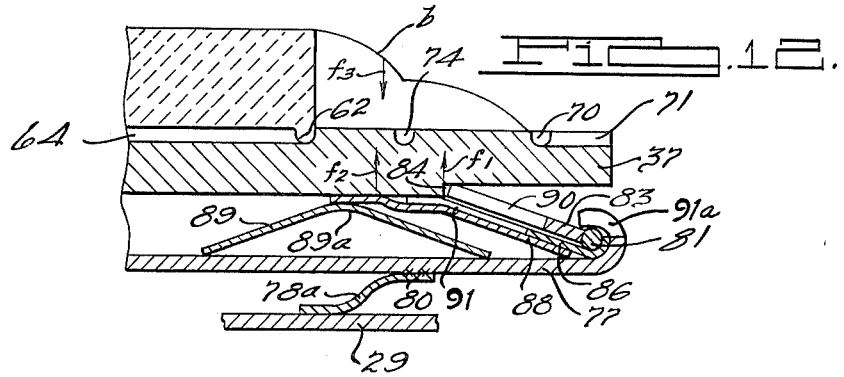
FIGURE 12 is a sectional view taken in the direction of the arrows substantially along the line 12—12 of FIGURE 11.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, an embodiment of the present invention is illustrated by way of example in an automotive gas turbine engine comprising a housing or frame 10 which includes a rotor bearing support 11 having rotor shafts 12 and 13 journalled therein. The shafts 12 and 13 are keyed to rotors 14 and 15, respectively, to be driven by the force of motive gases engaging the peripheral blades 16 and 17 of these rotors, as described below. The rotor shaft 12 is suitably keyed to the hub 18 of an air compressor having blades 19 which receive atmospheric air from inlet chamber 20 and discharge air under pressure through a diffuser 21 into a regenerator chamber 22 provided by the housing 10.

An axial flow regenerator 23 having an outer rim 24 and central hub 25 is rotatably mounted within the chamber 22 and arranged for axial shifting and angular adjustment therein by means of a spherical socket 26 carried by the hub 25 and seated on a ball element 27. The latter is rotatable and axially shiftable on a central fixed shaft 28 extending coaxially through the regenerator 23 and secured at its lower and upper ends to platforms 29 and 30, respectively, comprising fixed portions of the housing 10. The entire regenerator assembly is yieldably supported by means of lower seals 31 and 32 effective to engage portions of the housing 10 and the underside of regenerator 23 in sealing contact as described more fully below.

The regenerator 23 comprises a core or matrix of parallel axially extending gas passages and is suitably rotated by driving means, not shown, connecting the rotor shaft 12 and an annular ring gear 33 around the rim 24. Arranged to lie flat against the plane upper and lower faces of the core of regenerator 23 are flexible upper and lower sector plates 34 and 35, respectively. These plates are mirror images of each other so that only the lower plate 35 is illustrated herein. The latter comprises a peripheral portion coextensive with a peripheral portion of the lower end face of regenerator 23 and partitioned by a generally diametrical cross arm 37 into a high pressure sector or region 38 and low pressure sector or region 39, FIGURE 2. A central bore 37a in cross arm 37 is provided for passage of shaft 28.

The lower seal 32 extends entirely around the low pressure area 39 and is effective to prevent the entry of high pressure gases thereinto from region 38 and chamber 22. Directly above seal 35 and coextensive therewith is an upper seal 40 between the regenerator 23 and housing 10 effective to prevent entry of high pressure gases from region 38 and chamber 22 into the region 39. Seal 31 extends along the peripheral portion of sector plate 35 around the high pressure region 38 from one end of cross arm 37 to the other and is effective to prevent entry of high pressure gases from chamber 22 into region 38 below the regenerator 23. Above the regenerator 23 there is no seal comparable to seal 31 because the high pressure air of chamber 22 flows directly into the upper end face of regenerator 23.

The alternate heating and cooling of the portion of the rotating regenerator core subjects its upper and lower faces in contact with the seals 31, 32 and 40 to continual warping, such that the sector plates 34, 35 must possess considerable flexibility in order to conform to and maintain sealing contact with these regenerator faces. In general, the peripheral portions of regenerator 23 and plates 34, 35 will be dished upwardly with respect to their central portions because plate 35 and the underside of regenerator 23 will operate at higher temperatures than plate 34 and the upper side of the regenerator and will accordingly be subject to greater thermal expansion.

By the structure described, combustion supporting air from the compressor 18, 19 is discharged into chamber 22 and then into dome 41 above the high pressure sector 38. From dome 41, the high pressure gases flow downward and axially through the passages of the regenerator matrix into chamber 42 below the regenerator, from whence these gases are conducted to a combustion chamber to support fuel combustion. The hot combustion products are directed into collecting chamber 43 and then through an annular gas passage 44 to the rotor blades 16 and 17 to drive the same. The hot exhaust gases are then collected in an exhaust chamber 45 below the low pressure sector 39 and discharged axially upwardly through the regenerator matrix into exhaust duct 46.

Chamber 41 and duct 46 are separated from each other by the cross arm 34a of upper sector plate 34, seal 40, and the central upper platform 30 which overlies the arm 34a. Similarly, chambers 42 and 45 are separated by the cross arm 37, seal 32, platform 29, and baffles 48 which comprise part of the fixed housing structure 10. In the upward flow of the hot exhaust gases through low pressure region 39 of the regenerator core, the latter absorbs a large proportion of the residual heat of the exhaust gases which are then discharged at a nominal temperature into exhaust duct 49. In consequence of the rotation of regenerator 23, the portions thereof that are heated by the exhaust gases are continuously rotated to the high pressure sector 38. The comparatively cool gases from chamber 22 are thus heated in their downward passage through the regenerator 23 into chamber 42 and the regenerator core is cooled as at the beginning of the cycle.

The entire upper surface of sector plate 35 comprises a bearing surface 49 of a type suitable to complete a rubbing seal with the under face of the regenerator 23, the space between the bearing surface and underside of the regenerator comprising a restricted high resistance gas leakage path. Underlying the rubbing seal portion 49 is a flexible backing plate 50 which may comprise stainless steel. Below the backing plate 50 and extending entirely around the region 39 is channel seal 32 comprising an upper channel side 51 welded at its outer edge at 51a to the periphery of backing plate 50 to complete a continuous seam around region 39. A lower channel side 52 is welded at a continuous seam 53 to channel side 51 at the base of the channel to complete a channel seal 32 which opens radially outward into chamber 22 around the peripheral portion of sector plate 35 at the low pressure region 39, and which also opens radially into the high pressure region 38 along the length of the cross arm 37. The channel side 52 is provided with a retaining channel 54 which extends entirely around the area 39 and opens upwardly toward channel side 51. The channel 54 is fitted snugly in sealing relationship within the channel 55 of a fixed bracket 56 having an extension 57 suitably secured in sealing relationship by welding or bolts to the platform 29 entirely around the low pressure region 39. Inasmuch as the structure of the upper seal 40 is a mirror image of the lower seal 32, the upper seal is not illustrated in detail.

Seal 31, FIGURE 4, comprises upper and lower channel sides 58 and 59 welded together at a channel base 60 to complete a radially outwardly opening channel in communication with the high pressure chamber 22. The lower channel side 59 is supported on a semicircular extension 29a of platform 29, whereas the upper radially outer end of channel side 58 is welded at 58a to the outer peripheral edge of the backing plate 50. At the region of the ends of the cross arm 37, the channel seal 31 is received within the mouth of the channel seal 32 so as to complete a seal entirely around the circumference of sector plate 35 to prevent passage of high pressure gases at the region of the seals 31 and 32 into either sector 38 or 39. The channel sides 51, 52, 58 and 59 are preferably of resilient material adapted to withstand the high temperatures of the gases to be sealed and to effect a resilient support for the regenerator 23. During operation of the compressor 18, 19 the resiliency of the channel seals is supplemented by the high pressure in chamber 22 and sector 38 tending to maintain the channel seals in open position to support the weight of the regenerator 23.

Without some provision to the contrary, unbalanced torque on the sector plate 35 resulting from temperature gradients in the seal and the distribution of operational gas pressure forces thereon tends to twist the sector plate and cause unequal loading of various portions of the rubbing seal or bearing surface 49, so that the latter tends to wear unevenly. In order to predetermine and control the forces acting on plate 35, a substantially semicircular gas conducting groove 61 is provided in its upper bearing surface 49 in communication with the under surface of regenerator 23 at a predetermined location between the inner and outer peripheries of the sector plate 35. A similar gas conducting groove 62 extends lengthwise of the cross arm 37 at a predetermined location between the low pressure and high pressure regions 38 and 39. The grooves 61 and 62 are connected with the associated high pressure regions 22 and 38, respectively, by transverse gas conducting grooves 63 and 64.

By reason of this construction, the bearing surface of the rubbing seal 49 at the high pressure side of the groove 61 will be at substantially the same high pressure P throughout, as indicated by the horizontal pressure line $a$, FIGURE 5. This is true because the pressure from region 22 is conducted via ducts 63 to groove 61, so that no pressure gradient exists between the latter groove and the outer periphery of the sector plate 35. However, at the low pressure side of groove 61, the pressure distribution indicated by line $b$ is the result of small but unavoidable fluid leakage between the juxtaposed surfaces of rubbing seal 49 and the underside of regenerator 23. It is accordingly apparent that the portion of the rubbing seal 49 at the low pressure side of groove 61 is effective for both sealing and load bearing, whereas the portion of the rubbing seal 49 at the high pressure side of groove 61 is effective only for load bearing.

Below the sector plate 35, the high pressure P acting upwardly on the underside of the portion of channel side 51 which is in contact with backup plate 50 is represented by the horizontal line $c$. The force of the pressure P acting on the portion of the side 51 which is not in contact with the backup plate 50 is indicated by arrow $f1$, which may be considered to be acting vertically against the underside of sector plate 35 at the point where channel side 51 departs from its contact with the backup plate 50. Inasmuch as the comparatively low pressure $p$ within region 39 will leak between the backup plate 50 and outer upper surface of channel side 51, the resulting pressure directing downwardly on the bearing surface 49 under the line $a$ will equal $P-p$. Similarly, the resulting pressure directed upwardly on the portion of channel side 51 in contact with backup plate 50, indicated by the line $c$, will also equal $P-p$. The shaded area above the line $c$ counterbalances the corresponding area under the line $a$, leaving an unbalanced force under the line $c$ indicated by the arrow $f2$ located at the mid-region of the unshaded portion of the area under the line $c$.

By suitably locating groove 61 with respect to the inner and outer peripheral edges of the rubbing seal 49, the resultant of the pressure force under the line $b$ can be located so as substantially to balance the sum of the forces $f1$ and $f2$. The resultant of the pressure force under line $b$ is indicated by arrow $f3$ which will be directed downwardly at a location one third of the distance from groove 61 to the inner periphery of the rubbing seal 59, assuming as in the present instance a linear pressure distribution over the rubbing seal 49 at the low pressure side of groove 61. Also the force $f3$ can be located so that the sum of the moments of the forces $f1$, $f2$, and $f3$ will equal zero, or where desired the resultant unbalanced moment of the pressure forces can be located so as to counteract tendencies of the rubbing seal to wear unevenly in consequence of differences in materials at various locations, or differences in speed between the circumferentially inner and outer portions of the rubbing seal, or of thermally induced warping of the seal and regenerator. It is to be noted that if the location of groove 61 is shifted to the left or to the right from the position shown, $f3$ will be correspondingly shifted to enable balancing or other predetermination of the moments of forces $f1$, $f2$ and $f3$ as desired. Also preferably in the present instance, the sum of the forces $f1$ and $f2$ will be slightly greater than $f3$ so as to effect a resulting upward pressure urging seal 49 into sealing and sliding contact with the underside of regenerator 23. The same considerations apply in regard to the pressure distribution across the cross arm 37 and sector plate 34. In the above regard, the comparatively small resilient force of channel side 51 has been ignored. The effect of this force will be to shift $f2$ slightly to the right in FIGURE 5. However, the concept of predetermining the resultant moment and magnitude of the forces $f1$, and $f2$ and $f3$ by suitably locating groove 61 remains unchanged.

FIGURE 6 illustrates the effect of shifting groove 61 to the right in FIGURE 5 to the extreme limit so that the advantages of the present invention are not obtained. In other words in FIGURE 6, no groove 61 is provided. The line $b$ of FIGURE 5 is now represented by line B in FIGURE 6, which indicates a straight line pressure distribution from the low pressure region p to the high pressure region P. The resultant pressure force under line B is indicated by the downwardly directed arrow $f4$ located approximately two-thirds of the distance from the inner to the outer periphery of the rubbing seal 49. Force $f1$ directed upwardly will remain unchanged. The resultant of the pressure force above line c is indicated by arrow $f5$ directed upwardly at the mid-region of the line c.

Force $f5$ is the sum of the pressure forces (indicated by the shaded area above the line c of FIGURE 5 which balances the pressure forces under line a) and force $f2$. Force $f5$ is appreciably greater than force $f4$ because, without the benefit of groove 61, a large portion of force $f5$ is not balanced by a pressure force a as in FIGURE 5. Accordingly, the rubbing seal 49 is forced against the underside of regenerator 23 with excessive force, causing excessive wearing. In addition, the unbalanced moments due to forces $f1$, $f4$ and $f5$ will cause a clockwise torque on the rubbing seal 49 in FIGURE 6, resulting in undue loading of the rubbing seal 49 at its left or low pressure edge in contact with the regenerator surface. In consequence, the rubbing seal 49 tends to wear excessively along its low pressure or inner edge and its sealing effectiveness is impaired. Thus although the sealing area in FIGURE 6 is greater than that of FIGURE 5, the efficiency of the seal and its durability are materially enhanced in FIGURE 5 by reason of the properly located groove 61 which, as described above, enables control of both the torque and the magnitude of the sealing force on rubbing seal 49 to obtain optimum sealing conditions.

FIGURES 5 and 6 are concerned with a specific type of channel seal 32. The usefulness of the groove 61 connected with the high pressure gases is applicable to other types of seals as illustrated in FIGURE 7 where a total force represented by arrow Ft acting upwardly on sector place 35 is located as indicated. The resulting pressure force at the high pressure side of groove 61 is indicated by arrow F located at the mid-point between groove 61 and the outer periphery of rubbing seal 49. The resulting pressure force at the low pressure side of groove 61 is indicated by arrow $f$ located one-third of the distance between groove 61 and the low pressure or inner periphery of rubbing seal 49. By properly determining the location of groove 61, the moment arm x for force F and the moment arm y of force $f$ can be determined so that the moment Fx and Fy about Ft will approximately balance each other, the difference therebetween being predetermined to counterbalance forces causing uneven wearing of the rubbing seal surface, as for example forces resulting from differential thermal expansion of the rubbing seal and regenerator, or the greater friction at the faster moving outer peripheral portions of the rubbing seal. In addition the magnitude of the force Ft is partially counterbalanced by properly locating groove 61, such that the unbalanced force Ft will equal the desired sealing force urging the rubbing seal 49 into sealing engagement with regenerator 23. In consequence, optimum sealing conditions are achieved and uneven wearing at the seal is minimized.

It is apparent that other pressure distributions can be achieved by connecting groove 61 with the low pressure side of the seal, rather than with the high pressure side as shown, or with an entirely separate source of pressure, such as a pressurized inert gas, a lubricant, or other fluid as discussed above to lubricate the seal or otherwise enhance its chemical, temperature, or other characteristics. A straight line leakage pressure distribution is assumed in FIGURES 5–7, which is an approximation of the actual pressure distribution. It is of course to be understood that the curves a, b, c and B are schematic and may have other shapes than the straight lines shown.

FIGURE 8 illustrates the effect of the regenerator 23 rotating in the direction of the arrow in FIGURE 2 circumferentially across the cross arm portion of the seal so as to transport high pressure gases from the sector 38 to sector 39. The pressure distribution across the sealing surface of the rubbing seal cross arm 37 is illustrated schematically by the broken line b when the regenerator is not rotating. By virtue of the regenerator rotation, high pressure gases contained within the regenerator core and transported circumferentially across the cross arm will result in increased pressure distributed across the seal as indicated by the solid line b, FIGURE 8.

It is apparent that the effect of the regenerator rotation is to raise the pressure at all points along the radial portion of the cross arm seal across which the gases within the regenerator core are transported from the high pressure to the low pressure sector. Thus, the resulting pressure force indicated by the broken arrow $f3$ in FIGURE 8, when the regenerator is not rotating, will be shifted to the right in FIGURE 8, to the position of the unbroken arrow $f3'$. Conversely as indicated in FIGURE 9, wherein the broken line b and solid line b represent the pressure distribution when the regenerator is not rotating and when it is rotating, respectively, the effect of transporting low pressure gases from the low pressure sector 39 to the high pressure sector 38 is to reduce the pressure at all points across the corresponding radial portion of the cross arm and to shift the static force $f3$ leftward to the position of the dynamic force $f3'$.

In order to compensate for the rightward shift of the pressure force $f3'$ in FIGURE 8, a pressure equalizing groove 70, similar to groove 62, is formed in the upper surface of the radial portion of the cross arm rubbing seal 37 across which high pressure is transported from sector 38 upon rotation of the regenerator, FIGURES 10–12. Groove 70 is connected to the low pressure sector 39 by a plurality of transverse grooves 71, similar to grooves 64. As illustrated in FIGURE 10, the resultant force F of any pressure distribution that would exist across rubbing seal 37 without recourse to the grooves 70 and 71 will be shifted leftwardly to F' when the grooves 70 and 71 are employed.

By properly determining the location of groove 70, the resultant F of the broken line pressure distribution curve in FIGURE 10 can be shifted leftward to the position of the resultant F' of the solid line pressure distribution curve, i.e. back to the position of $f3$ in FIGURES 8 and 9. Also, the groove 70 enables groove 62 to be shifted rightward in FIGURE 10 while maintaining the moment arm for the resultant F' equal to the moment arm for the resultant $f3$ in FIGURES 8 and 9. In consequence the counterbalancing force under the line a in FIGURE 10 can be increased, so as to effectively decrease the magnitude of the sealing force urging seal 37 against the regenerator 23. Accordingly, the grooves 70 and 71 cooperate with the grooves 62 and 64 to facilitate balancing of the various forces acting on the seal, so as to minimize loading and unequal wearing thereof.

FIGURE 12 illustrates the application of grooves 62 and 70 cooperating to effect a predetermined sealing load and torque on the rubbing seal 49, 37 with a modified form of seal between the rubbing seal and engine frame structure.

In consequence of the rotation of the regenerator and the transportation of gases circumferentially across the cross arm portion of the seal, the regenerator efficiency is reduced in direct relationship to the amount of high pressure gases lost from the sector 38 to the low pressure sector 39. In order to minimize the resulting loss in efficiency and also in order to achieve a more linear pressure distribution curve b in FIGURES 12 and 13, a generally diametrically extending pressure transporting groove 74 is formed in the upper surface of the rubbing seal cross arm 37 and extends radially from the opening 37a at a location between grooves 62 and 70. A similar pressure transporting groove 75 extends radially from the central opening 37a in the opposite direction.

The grooves 74 and 75 are in communication by reason of leakage around the pin 28 within central opening 37a. High pressure gases transported to groove 74 upon rotation of the regenerator 23 flow diametrically to the groove 75 and thence back to the high pressure sector 38 upon continued rotation of the regenerator. Inasmuch as the grooves 74 and 75 are comparatively shallow, a pressure gradient will exist therealong from the high pressure end 74 to the low pressure end 75 in consequence of the restricted cross sectional areas of said grooves, and the rate of gas flow along said grooves will be retarded correspondingly. Accordingly, the pressure at the region of groove 74, indicated by the pressure distribution curve b in FIGURE 12, will be lower than if the groove 74 were not provided. Similarly, as indicated by the pressure distribution curve b of FIGURE 13, the pressure at the region of the groove 75 will be higher than the pressure that would otherwise exist if that groove were not provided.

Figure 14:
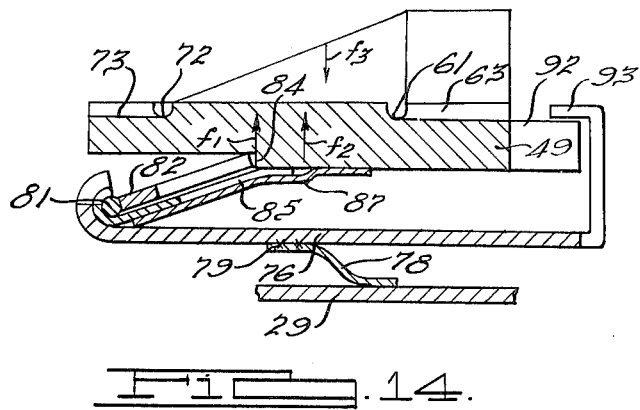
FIGURE 14 is a sectional view taken in the direction of the arrows substantially along the line 14—14 of FIGURE 11.

In FIGURES 11 and 14, the low pressure side of the rubbing seal 49 is provided with a circumferentially extending groove 72 similar to grooves 70 and 61. The groove 72 is formed in the upper surface of the circumferential portion 49 of the rubbing seal which extends along the sector 39 and is connected with the low pressure gases of sector 39 by a plurality of radial grooves 73 similar to grooves 63. The grooves 72 and 73 cooperate with the grooves 61 and 63 to enable predetermination of the pressure forces acting on the circumferential portion of the rubbing seal 49 so as to achieve the desired magnitude and moment of the resultant sealing force urging the rubbing seal 49 into contact with the underside of the regenerator core 23.

Figure 13:
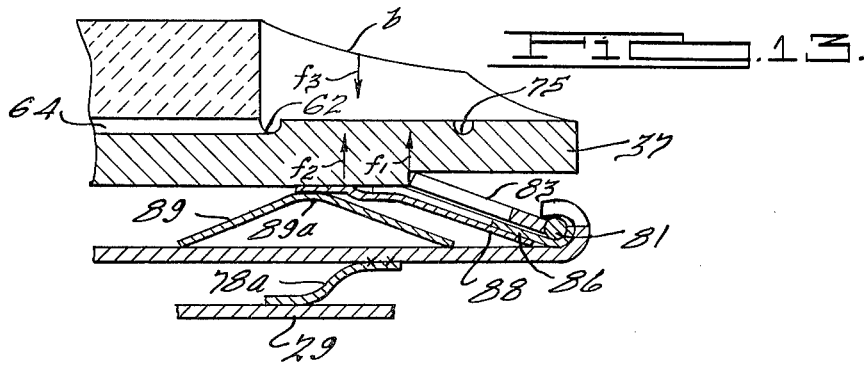
FIGURE 13 is a sectional view taken in the direction of the arrows substantially along the line 13—13 of FIGURE 11.

The seal at the underside of the rubbing seal 37, 49 in FIGURES 12–14 comprises an annular base plate 76 having a diametrical cross arm portion 77, the portions 76 and 77 underlying and being generally coextensive with the corresponding portions 49 and 37 of the rubbing seal. An annular seal 78 of flexible resilient material, FIGURE 14, having a diametrical cross portion 78a, FIGURES 12 and 13, underlies the periphery 76 and cross portion 77, respectively, of the base plate. The seal 78 is welded at its upper edge at 79 to the underside of the circular base plate portion 76. The annular portion of seal 78 extends conically from the weld 79 to an outer portion in sliding and sealing engagement with the housing flange 29, 29a, thereby to cooperate with the base plate portion 76 in the provision of a bellows type seal opening radially outwardly in communication with the high pressure gases within chamber 22. The cross arm seal portion 78a is similarly welded at an upper edge 80 to the underside of the cross arm portion 77 of the base plate and extends downwardly in the direction toward the high pressure sector 38 to slidably engage the cross arm housing flange 29 in sealing relationship. The flexible seal portion 78a and the base plate portion 77 also comprise a bellows type seal in communication with the high pressure gases in sector 38.

Extending entirely around the low pressure sector 39 is a temperature resistant wire 81 spaced from the periphery of the rubbing seal 49 by a comparatively rigid semicircular bridge 82 and spaced from the cross arm portion 37 by a similar but diametrical cross arm bridge 83. The upper ends of the bridges 82 and 83 are loosely confined by a shoulder 84 formed by a step in the underside of the rubbing seal portions 49 and 37 at the low pressure side of the seal. Thus the bridge 82, 83 and wire 81 are free to swing vertically about the juncture of the bridge with the shoulder 84 so as to accommodate movement of the flexible rubbing seal 37, 49 resulting, for example, from distortion of the regenerator 23.

Immediately underlying the bridge portions 82 and 83 and bridging their junctures with the rubbing seals at the shoulder 84 are diaphragm supports 85 and 86, respectively. The lower inner ends of the diaphragm supports 85 and 86 are formed around the wire 81 and are clamped securely thereto by upwardly curved inner portions of the base plates 76 and 77. Thus the diaphragm supports provide a seal between the wire 81 and the corresponding inner ends of the base plates 76 and 77. Prior to clamping the supports 85, 86 by the curved edges of the base plates 76 and 77, the latter may be welded to the supports 85, 86 to assure a seal therewith extending entirely around sector opening 39. Underlying the diaphragm supports 85 and 86 are corresponding diaphragm seals 87 and 88 having their lower inner ends wedged tightly between the corresponding portions of the base plates 76, 77 and diaphragm supports 85, 86 and having their upper ends in sliding and sealing engagement with the underside of the corresponding portions of the rubbing seal 37, 49. Both the supports 85, 86 and seals 87, 88 are of thin flexible temperature resistant resilient material. The diaphragm seals 87, 88 cooperate with the base plates 76, 77 to cause a bellows type seal opening toward the high pressure gases of sector 38 and chamber 22.

By reason of the downwardly flowing cooling gases at the high pressure sector 38 and the upwardly flowing hot gases at the low pressure sector 39, the bottom portion of the regenerator 23 in FIGURE 1 will be hotter than the upper portion during operation, such that the regenerator will be dished upwardly about its center in consequence of unequal thermal expansion at its lower and upper faces. Thereafter, when the engine is not in operation and the regenerator cools, the regenerator will return to its original shape. The flexible diaphragm 88 is so thin however that its resiliency is frequently insufficient to cause it to follow the contour of the regenerator and maintain sealing engagement therewith. Accordingly, during the next attempt to start the engine, leakage of combustion supporting air between seal 88 and the underside of the rubbing seal cross arm 37 causes difficulty in starting. The leakage is particularly objectionable because the auxiliary electric starting motor for the compressor will necessarily have comparatively small power and will supply only sufficient combustion supporting air to start an efficiently operating engine.

The problem of cold starting has been avoided by means of a diametrically extending leaf spring 89 between the cross arm base plate portion 77 and diaphragm seal 88. The spring 89 extends substantially the entire length of the cross arm rubbing seal 37 and is provided with a comparatively sharp curvature 89a underlying the upper or high pressure end of the diaphragm seal 88 to urge the latter into fluid sealing engagement with the rubbing seal portion 37. From the curvature 89a, the spring 89 extends symmetrically in opposite directions to the base plate portion 77. It is important that the spring 89 make substantially a line contact with diaphragm 88 at the region of curvature 89a in order that the right leg of spring 89 in FIGURE 12 does not engage diaphragm 88 and cause its sealing portion to buckle away from the underside of the rubbing seal portion 37.

In order to enhance the flexibility for the bridge 82, 83 and diaphragm supports 85, 86, these are provided with a plurality of slots 90 and 91 respectively at locations spaced around the circumferences of the sector 39. Similarly, the low pressure ends of the base plate portions 76, 77 are provided with a plurality of slots 91a spaced around the periphery of the sector 39 in order to facilitate clamping of the base plate snugly around the wire 81. At several places around the periphery of the circumference of the rubbing seal 49 are integral tabs 92 over which are hooked extensions 93 of the high pressure end of the circumferential base plate portion 76. Suitable clearance is provided between the tabs 92 and extensions 93 in order to accommodate limited movement of the rubbing seal 49 during warping of the regenerator.

Reference is hereby made to the copending application Serial No. 314,318, filed on the filing date of the present application, for further details of the seal structure illustrated in FIGURES 11–14 and underlying the rubbing seal 49, 37.

Where the grooves 74 and 75 are not employed, as in FIGURES 2, 8 and 9, the weight of the gases transferred from the high pressure sector 38 to the low pressure sector 39 resulting from rotation of the regenerator is $W_H = VND_H$. The corresponding weight of the gases transferred from the low pressure sector 39 to the high pressure sector 38 is $W_L = VND_L$. In the above equations, $W_H$ is the weight of the high pressure gases carried from sector 38 to sector 39, $W_L$ is the weight of the low pressure gases carried from sector 39 to sector 38, V and N are the gas carrying volume and speed of rotation respectively of the regenerator 23, and $D_H$ and $D_L$ are the densities of the high pressure and low pressure gases respectively. The net loss of gases from sector 38 to sector 39 thus equals $W_H - W_L = VN(D_H - D_L)$.

Referring now to FIGURES 11–13 a slight pressure drop amounting to approximately 5 p.s.i. will exist between the high pressure end of groove 74 and the low pressure end of groove 75 because of the small cross sectional areas of these grooves. Thus the densities of the gases in grooves 74 and 75 will differ slightly. It can be assumed as a reasonable first approximation that the density of the gases is the same in both grooves 74 and 75 and equals $D_i$, which will be somewhat less than the density $D_H$ because the pressure in grooves 74 and 75 is lower than the pressure in sector 38, both by reason of the pressure drop across the seal from groove 62 to groove 74 and also by reason of the flow of gases from groove 74 to groove 75.

Inasmuch as a portion of the gases transported from sector 38 to groove 74 by rotation of the regenerator is conducted to groove 75 and thence back to sector 38 by continued rotation of the regenerator, the loss of gases from sector 38 to sector 39 in the construction illustrated in FIGURE 12 will be only $W_i = VND_i$ and the net loss of gases from sector 38 is $W_i - W_L = VN(D_i - D_L)$. The less the difference between $D_i$ ad $D_L$, the less will be this net loss of gases. For this reason among others, groove 75 is offset from groove 74 in the direction toward section 39. In addition, groove 75 is offset toward sector 39 to increase the pressure gradient across the surface of 39 the rubbing seal between groove 75 and sector 39 and to effect a more linear pressure distribution curve $b$ across the seal, FIGURE 13.

The value of $D_i$ in the expressio $nVN(D_i - D_L)$ could be reduced, so as to reduce the net loss of gases from sector 38 toward sector 39 in FIGURE 11. However, groove 74 also serves to effect a more linear pressure distribution curve $b$ in FIGURE 12 and to shift the corresponding force $f3$ to the left. The location of groove 74 is therefore determined so as to properly locate $f3$ with respect to $f2$ and $f1$ and at least partially counterbalance both the magnitude and torsional effect of these forces, the force of spring 89 in FIGURE 11, and the forces on the seal resulting from thermally induced differential expansion between the regenerator and rubbing seal, thereby to determine the resultant force urging each unit of area of rubbing seal 37, 49 against the regenerator 23. Optimum sealing conditions are obtained and force resulting in excessive friction induced wearing of the seal is avoided. Also by suitably predetermining the location of the resultant pressure force urging the rubbing seal against the regenerator 23, a predetermined desired torque against the rubbing seal is obtained to minimize non-uniform wearing of the seal.

I claim:

1. In a gas turbine engine, a supporting frame, a rotary regenerator mounted in said frame and adapted for passage of separate streams of gases at relatively high and low pressures and at different temperatures respectively thru separate portions thereof, means cooperable with said regenerator and frame for defining flow paths for said separate streams of gases and for effecting a seal therebetween including a sealing element having a bearing surface in sliding contact with the rotating surface of said regenerator and having opposite high and low pressure edges exposed to said high and low pressures respectively, said bearing and rotating surfaces providing a restricted gas leakage path therebetween across the width of said seal from said high pressure to said low pressure, means cooperable with said frame for flexibly supporting said sealing element to enable relative movement of said edges with respect to each other toward and from said rotating surface and subject to the pressure of said gases for urging said bearing surface into said contact with said rotating regenerator surface with a resultant force having unequal moments about said edges, said sealing element having sufficient rigidity across its width between said edges to at least partially distribute said force across said width and having sufficient resiliency lengthwise of said seal to yield with said force and conform generally to said rotating surface to maintain said restricted leakage path upon warping of said regenerator, and a gas conducting groove in communication with said high pressure gases and extending in said bearing surface lengthwise of said seal for distributing the pressure of the gases in said leakage path to effect a resultant force counterbalancing said unequal moments.

2. In the combination according to claim 1, a plurality of grooves in said bearing surface spaced along the length of said seal and extending from the first named groove to said high pressure edge to comprise means effecting the communication therebetween, thereby to apply substantially said high pressure to the area of said bearing surface between said grove and said high pressure edge and to apply to the area of said bearing surface between said groove and said low pressure edge a pressure distributed in a gradient ranging from said high pressure at said groove to said low pressure at said low pressure edge, said areas effecting a resultant force exerted by the gas pressures thereon opposing said unequal moments.

3. In a gas turbine engine, a rotary regenerator rotatable about a central axis and having axially spaced rotating end surfaces adapted for axial passage of separate streams of gases at relatively high and low pressures and at different temperatures respectively thru separate sectors thereof, means for defining flow paths for said separate streams of gases and for effecting a seal therebetween including a sealing element having a pair of sector arms extending generally radially from said axis between said separate streams and defining said sectors, each sector arm having a bearing surface in sliding contact with the same one of said rotating end surfaces and having opposite high and low pressure edges exposed to said high and low pressures respectively, each bearing surface cooperating with said one rotating surface to provide a restricted gas leakage path therebetween across the width of the seal from said high pressure to said low pressure to effect a pressure gradient across said width, a separate gas conducting groove extending radially in each bearing surface, the groove in each bearing surface opening into the associated leakage path at a predetermined pressure region thereof and being spaced by portions of said path from both said high and low pressures, the pressure at said predetermined region of the leakage path across which said one end surface rotates from low pressure to high pressure being lower than the pressure at said predetermined region of the other leakage path, and gas passage means connecting the gas conducting grooves in said two sector arms for reducing the pressure differential therebetween.

4. In the combination according to claim 3, a high pressure gas conducting groove extending radially in the bearing surface of each sector arm at a location between the first named groove therein and said high pressure edge, a low pressure gas conducting groove extending radially in the bearing surface of only the sector arm across which said one rotating end surface rotates from high pressure to low pressure, said low pressure groove being between said first named groove therein and said low pressure edge, and means connecting said high pressure and low pressure grooves respectively with said high pressure and low pressure gases.

5. In a gas turbine engine, a rotary regenerator rotatable about a central axis and having axially spaced rotating end surfaces adapted for axial passage of separate streams of gases at relatively high and low pressures and at different temperatures respectively thru separate sectors thereof, means for defining flow paths for said separate streams of gases and for effecting a seal therebetween including a sealing element having a pair of sector arms extending generally radially from said axis between said separate streams and defining said sectors, each sector arm having a bearing surface in sliding contact with one of said rotating end surfaces and having opposite high and low pressure edges exposed to said high and low pressures respectively, each bearing surface cooperating with said one rotating surface to provide a restricted gas leakage path therebetween across the width of the seal from said high pressure to said low pressure to effect a pressure gradient across said width, a gas conducting groove extending radially in each bearing surface, the groove in each bearing surface opening into the associated leakage path at a predetermined pressure region thereof and being spaced by portions of said path from both said high and low pressures, the pressure at said predetermined region of the leakage path across which said one end surface rotates from low pressure to high pressure being lower than the pressure at said predetermined region of the other leakage path, and gas passage means connecting the radially inner ends of said grooves in said two sector arms for reducing the pressure differential between said grooves.

6. In combination according to claim 5, said grooves having restricted cross sectional areas to retard the rate of gas flow therealong, and the groove opening into said predetermined region of lower pressure being offset toward the low pressure edge of its associated bearing surface with respect to the groove in the other bearing surface.

7. In a gas turbine engine, a supporting frame, a rotary regenerator mounted in said frame and adapted for passage of separate streams of gases at relatively high and low pressures and at different temperatures respectively thru separate portions thereof, means cooperable with said regenerator and frame for defining flow paths for said separate streams of gases and for effecting a seal therebetween including a sealing element having a bearing surface in sliding contact with the rotating surface of said regenerator and having opposite high and low pressure edges exposed to said high and low pressures respectively, said bearing and rotating surfaces providing a restricted gas leakage path therebetween across the width of said seal from said high pressure to said low pressure, means cooperable with said frame for flexibly supporting said sealing element to enable relative movement of said edges with respect to each other toward and from said rotating surface and subject to the pressure of said gases for urging said bearing surface into said contact with said rotating regenerator surface with a resultant force having unequal moments about said edges, said sealing element having sufficient rigidity across its width between said edges to at least partially distribute said force across said width and having sufficient resiliency lengthwise of said seal to yield with said force and conform generally to said rotating surface to maintain said restricted leakage path upon warping of said regenerator, means for applying the pressure of the gas in said leakage path to effect a resultant force on said bearing surface counterbalancing said unequal moments, including a gas conducting groove extending lengthwise of said seal in said bearing surface and also including means for connecting said groove with the gas pressure at one edge of said seal, thereby to apply substantially the pressure at said one edge to the area of said bearing surface between said groove and one edge and to apply to the area of said bearing surface between said groove and the other edge of said seal a pressure distributed in a gradient ranging from the pressure at said groove to the pressure at said other edge, said areas being dimensioned to effect said resultant force.

References Cited by the Examiner
UNITED STATES PATENTS

| | | | |
|---|---|---|---|
| 1,876,520 | 9/1932 | Newkirk et al. | 277—96 |
| 2,880,972 | 4/1959 | Williams | 165—9 |
| 3,122,200 | 2/1964 | Koch | 165—9 |

FOREIGN PATENTS

| | | |
|---|---|---|
| 735,250 | 8/1955 | Great Britain. |

ROBERT A. O'LEARY, *Primary Examiner.*

CHARLES SUKALO, *Examiner.*